US005505365A

United States Patent [19]
Olsen

[11] Patent Number: 5,505,365
[45] Date of Patent: Apr. 9, 1996

[54] METHOD OF ACCURATELY JOINING TOGETHER TWO SHEET SECTIONS

[75] Inventor: Flemming Olsen, Stenlille, Denmark

[73] Assignee: IPU Instittutet for Produktudvikling, Lyngby, Denmark

[21] Appl. No.: 290,970

[22] PCT Filed: Feb. 25, 1993

[86] PCT No.: PCT/DK93/00065

§ 371 Date: Aug. 24, 1994

§ 102(e) Date: Aug. 24, 1994

[87] PCT Pub. No.: WO93/16839

PCT Pub. Date: Sep. 2, 1993

[30] Foreign Application Priority Data

Feb. 25, 1992 [DK] Denmark .................... 0239/92

[51] Int. Cl.$^6$ .............. B23K 15/00; B23K 26/00
[52] U.S. Cl. .............. 228/135; 228/171; 228/102
[58] Field of Search .................. 228/102, 135, 228/171, 212, 5.7; 219/121.64, 121.72, 124.21, 125.1; 148/196

[56] References Cited

U.S. PATENT DOCUMENTS 1,773,068  8/1930  Vienneau .................... 228/171
1,863,873  6/1932  Quarnstrom .................... 228/171
4,215,299  7/1980  Edwin et al. .................... 219/124.34
4,741,471  5/1988  Sullivan .................... 228/166
5,190,204  3/1993  Jäck et al. .................... 228/5.7

FOREIGN PATENT DOCUMENTS 1333     10/1862  France .................... 228/171
44548    11/1977  Japan .................... 228/171
114734    5/1987  Japan .................... 228/171

Primary Examiner—Samuel M. Heinrich
Attorney, Agent, or Firm—Scully, Scott, Murphy & Presser

[57] ABSTRACT

The invention relates to a method of accurately joining together two sheet sections along edges of the sheets having complementary shapes, and wherein the edge of at least one sheet section is formed by means of a numerically controlled machine with the sheet section fixed in a fixture by moving a cutting member relative to the sheet section according to a predetermined path, whereafter complementary edges of the two sheet sections are made to abut each other and the two sheet sections are welded together in a numerically controlled machine, one sheet section being fixedly retained in said fixture and the knowlegde of the path used during cutting is used to determine the path of the welding means at the welding of the sheet sections.

10 Claims, 5 Drawing Sheets

A

B

C

METHOD OF ACCURATELY JOINING TOGETHER TWO SHEET SECTIONS

TECHNICAL FIELD

The invention relates to a method of accurately joining together two sheet sections along edges of said sheets having complementary shapes, and wherein the edge of at least one sheet section is formed by means of a numerically controlled machine with the sheet section fixed in a fixture by moving a cutting member relative to the sheet section according to a predetermined path, whereafter complementary edges of said two sheet sections are made to abut each other and the two sheet sections are welded together in a numerically controlled machine, said one sheet section being fixedly retained in said fixture and the knowlegde of the path used during cutting is used to determine the path of the welding means at the welding of the sheet sections.

BACKGROUND ART

In the fabrication of motor vehicles a method of the above type is known, whereby a trimming of the edge of a first sheet section is carried out in a numerically controlled laser cutting/welding machine, said first sheet section being fixedly retained in a fixture, whereafter a second sheet section, which is also fixed in the said fixture, is cut along an edge and the two edges are brought into abutment for a subsequent welding together of the sheet sections. The fixture used at said method is very strong and comparatively complicated construction.

German patent No. 1.119.057 discloses joining of two metal strips by forming a dovetailed protrusion in the first strip and forming a complementary tab in the second strip, which are subsequently brought into engagement with each other. The two sections are then connected by means of welding, for instance by resistance spot welding. The object is to hold the ends of the two strips together to form a coherent strip at a subsequent processing thereof.

Finally, from U.S. Pat. No. 3,091,844 it is known to provide the ends of strips of metal with complementary dovetailed protrusions and tabs for keeping the strips together during a subsequent compression of the joint and in a subsequent processing in a roller. Thus, no accurate joining of sheet parts is disclosed.

DISCLOSURE OF INVENTION

The object of the invention is to provide a method of the type stated in the introduction enabling an accurate weld joint of sheet sections by means of more simple fixtures than hitherto.

The method according to the invention is characterised in that the complementary edges are arranged in at least one projecting area on one sheet section and in a complementary area on the other sheet section, and the two complementary areas have interlocking shapes for preventing mutual displacement of the sheet sections at least in directions parallel to the surfaces thereof in the joint area. Due to the accurate geometrical interlocking, the stress produced by the heat during welding are absorbed by the inter-gripping areas of the sheet sections. As the sheet sections thus merely are to be controlled transversely to their surface, much simpler and thinner fixtures may be used than hitherto. At the same time, the accurate geometrical interlocking ensures that a minimal and accurate joint gap is maintained between the sections. As a result, very smooth welds are obtained without the use of filler materials. Consequently, most advantageously only minimal or no further machining of weld seam is necessary. In order to obtain a weld seam requiring very little or no further machining, the sheet sections have to be cut out with such an accuracy that the width of the gap between the complementary edges does not exceed 0.2 mm and preferably are less than 0.1 mm. To obtain such tolerances it is advantageous to carry out machining in a combined laser cutting and welding machine. It is, however, evident that also other cutting and welding methods having the required accuracy may be used, such as plasma cutting and water jet cutting. Beside laser welding other welding methods may be used, such as electron beam welding and plasma welding.

According to the invention the edge faces or cut faces of the edges may be arranged on mutually complementary cylinderical faces, whereby the sheet section are brought into engagement by a movement along the axis the cylindrical faces, in which direction no geometrical interlocking of the two sheet sections will take place.

According to another embodiment of the invention, when the sheet sections are plane in the joint area the edge faces may advantageously be perpendicular to the surface of the sheet sections in the joint area. This embodiment provides many possibilities of variation, as regards the method of production of the other sheet section, as this for instance may be punched.

Moreover, according to the invention the angle of the edge faces relative to the surfaces of the sheet sections may vary complementarily to each other along the edges. When the angle of the edge face is not perpendicular to the surfaces of the sheet sections, the deviations from perpendicular may advantageously be appropriately minor ones, whereby the subsequent welding (for instance laser welding) may be carried out by means of a beam essentially perpendicular to the surface by means of a single run. The most advantageous width of the beam should thus be taken into consideration when selecting the deviations from perpendicular.

Furthermore, in this connection the angle of the edge faces may according to the invention vary relative to the surface of the sheet sections with appropriate minor positive and negative deviations from perpendicular enabling the edges of the two sheet sections to engage interlockingly. As a result, by selecting the appropriate size and position of the positive and negative deviations from perpendicular along the egdes of the sheet sections, a complete fixation of the sheet sections relative to each other in a direction perpendicular to the surfaces thereof in the joint area is obtained. The use of a fixture for positioning of the two section relative to each other during welding may thereby be avoided, at least theoretically.

Moreover, according to the invention, the projecting area may be T-shaped or trapezoidal. In practice, this embodiment has produced very advantageous results.

In this connection, according to the invention the edge portion of the projecting trapezoidal area corresponding to the long base line of the trapezoidal portion may have an egde face forming a positive angle relative to the surface of the sheet section, while the edge portion of the sheet section forming an extension of the short base line of the trapezoid may have an edge face forming a negative angle relative to the surface of the sheet section or vice versa. As a result, it is possible by means of a pivot movement about a line intermediate the lines corresponding to the two base lines of the trapezoid to bring the sheet section into interlocking engagement, whereafter merely a mutual fixation of the sheet sections against being pivot in the opposite direction of the engagement movement is necessary to hold the section together accurately.

Finally, according to the invention the edge portion of the projecting trapezoidal area corresponding to the long base line of the trapezoidal portion may have an edge face having portions of both a positive and a negative angle relative to the surface of the sheet section, and the edge portion forming an extension of the short base line of the trapezoid may likewise have an edge face having portions of both a positive and a negative angle relative to the surface of the sheet section. This embodiment is particularly advantageous as regards an approximately completely fixation of the two sheet sections relative to each other.

BRIEF DESCRIPTION OF THE DRAWINGS

The invention is described in greater detail in the following with reference to accompanying drawings, in which.

BEST MODE FOR CARRYING OUT THE INVENTION

The following explanation of the method according to the invention is based on a joint of two sheet sections which at least in their joint area are plane in order to make the explanation and illustration of the provided joints more simple. Furthermore, it is presumed that the method is carried out out by means of a numerically controlled (CNC controlled) laser cutting/welding machine, it being implicit that as previously mentioned other methods may be used for the cutting and welding provided that these are carried out by means of numerical control.

Figure 1:
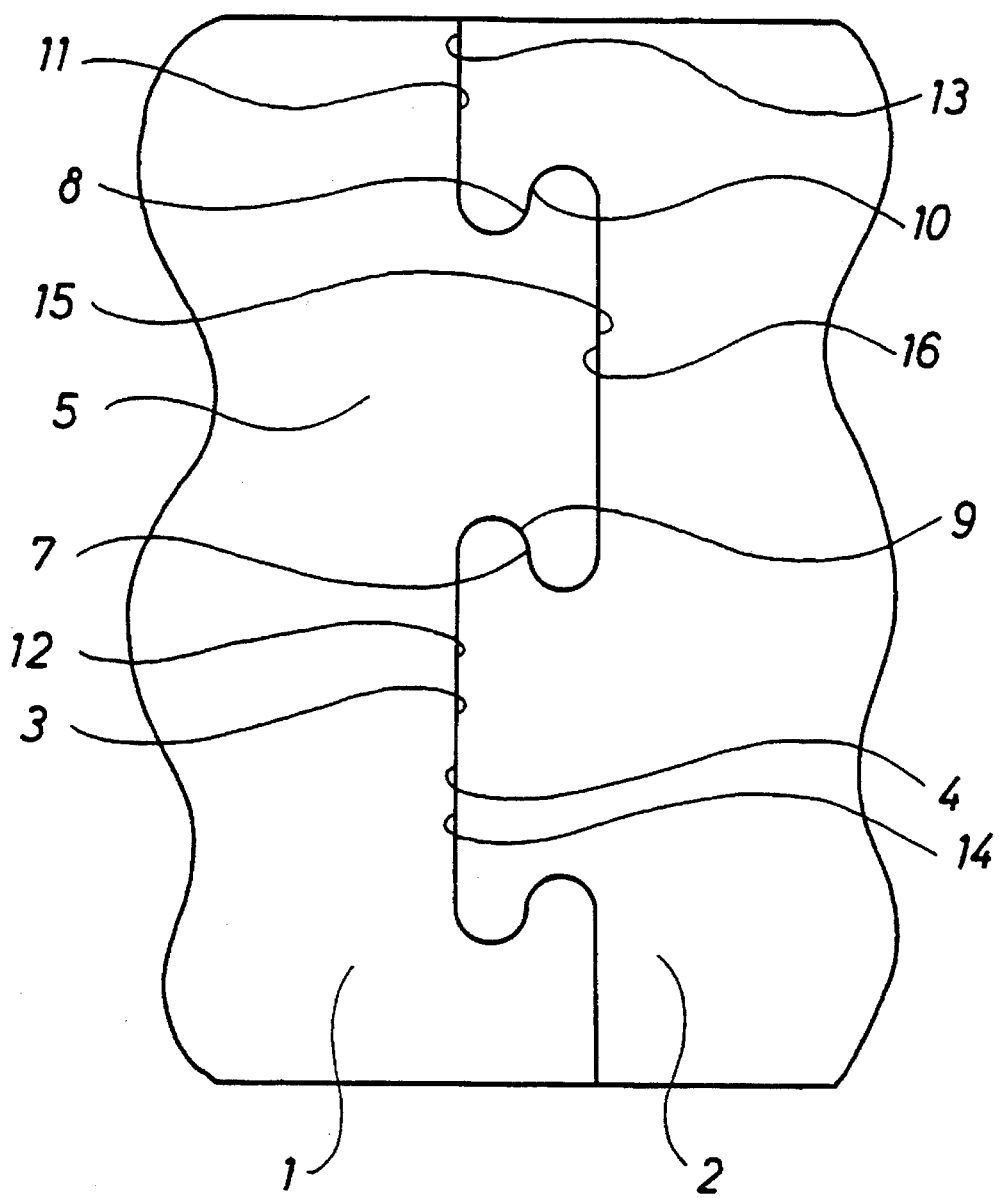
FIG. 1 is a top view of a first joint of two sheet sections obtained by means of the method according to the invention.

With reference to FIG. 1, the edge (3) of a first section (1) is cut by means of a numerically controlled laser cutting/welding machine, the section (1) being fixedly retained in a fixture (not shown). A second sheet section (2) is then made having an edge (4) corresponding to the edge (3), that is to say it is complementary to said edge. The cutting of the edge (4) on the sheet section (2) may be carried out by means of any known method. The edge (3) of the first sheet section (1) is cut according to such a path that the sheet section (1) is provided with at least one T-shaped or trapezoidal projecting area (5). Consequently, the second sheet section (2) has a complementary area. Furthermore, the edges (3,4) of the sheet sections (1,2) are cut in such manner that the edge faces thereof are perpendicular to the surface of the sheet sections (1,2) and complementary to each other.

The thus completely complementary edge portions of the sheets are made to engage each other with abutting edge faces by a movement perpendicular to the surface of the paper shown in FIG. 1. Due to the interlocking shape of the edges, any mutual displacement of the sheet sections (1,2) in the common plane thereof is prevented, when the edges (3,4) have been brought into engagement with each other, whereby only a fixation of the sheet section (2) relative to the sheet section (1) is necessary in the mentioned direction perpendicular to the surface of the paper. Subsequent to such a fixation of the sheet section (2) relative to the sheet section (1), the two sheet sections (1,2) are welded together, the sheet section (1) still being fixedly retained in the fixture used for cutting the edge (3). The welding may be carried out by moving a welding member along the same path used for cutting the edge (3), the tool offset, however, being taken into consideration. By carrying out the welding in the same setup as during cutting and by taking the path used at the cutting into consideration, a very accurate weld of a high quality is obtained.

Figure 5:
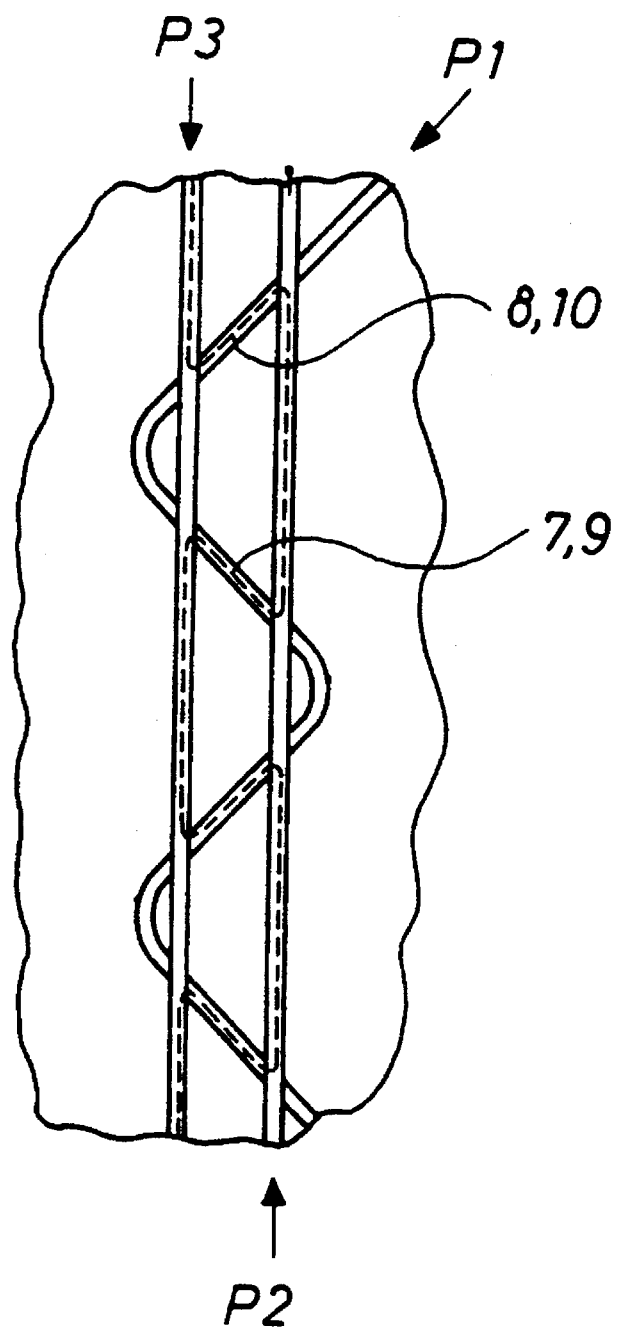
FIG. 5 is a top view of an example of weld of two sheet sections obtained by means of the method according to the invention.

As illustrated in FIG. 5, alternatively to using exactly the same path (including the tool offset) at the welding as at the cutting, three runs may be used during the welding. At the first run or passage P1 a wave-shaped weld is produced, whereby the edge portions of the trapezoidal projection (5) forming the faces (7,8) of the trapezoid, is welded together with the complementary edge portions (9,10) of the sheet section (2). At the second run or passage P2 the edge portions (15) on projecting trapezoidal area (5) of the sheet section (1) corresponding to the long base line of the trapezoid are welded together with the complementary edge portions (16) of the second sheet section (12). At the third run or passage P3 the edge portions (11,12) of the sheet section 81) forming an extension of the short base line of the trapezoid are welded together with the complementary edge portions (13,14) of the complementary edge of the sheet section (2).

By using all of the three runs or passages P1–P3 a complete welding of the abutting edges (3,4) of the two sheet sections (1,2) is obtained, as shown by means of the dotted line in FIG. 5. The use of the mentioned three runs is advantageous in that sharp turns in the welding path are avoided, and in some cases a higher welding rate may be obtained. If the distance between the welding paths P2 and P3 is small, that is to say that the height of the trapezoidal projection is low, the wave-shaped run P1 may be omitted.

Figure 2:
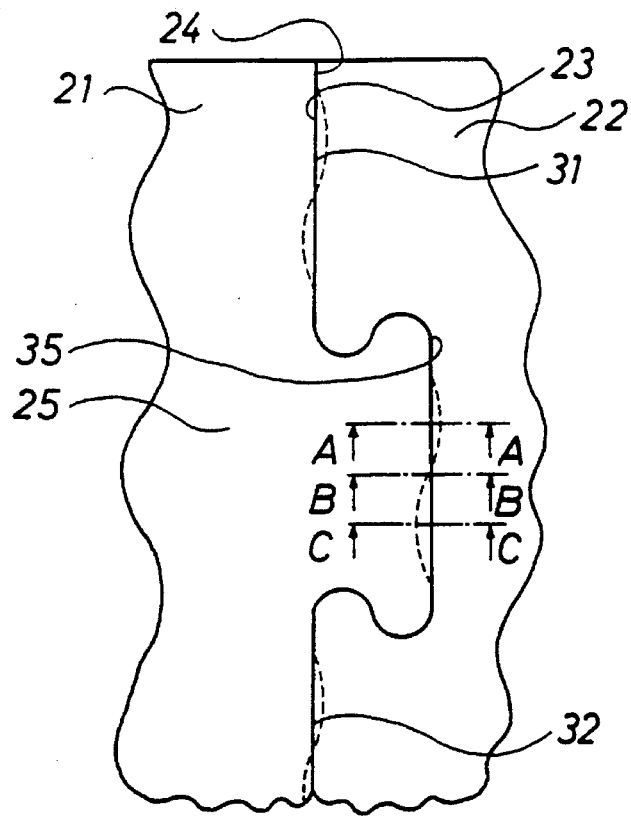
FIG. 2 is a top view of a second joint obtained by means of the method according to the invention.
Figure 2A:
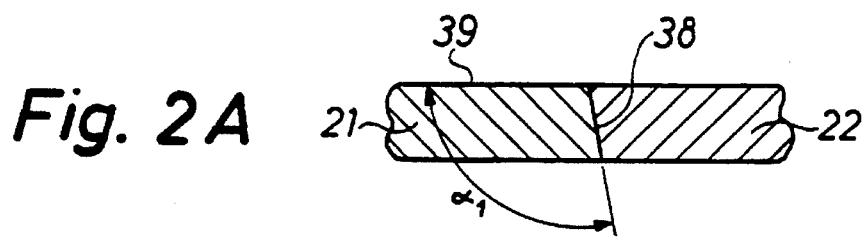
FIGS. 2a–c are sectional views along the lines AA, BB, and CC in FIG. 2.
Figure 2B:
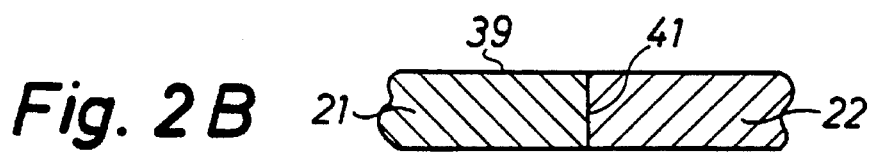
Figure 2C:
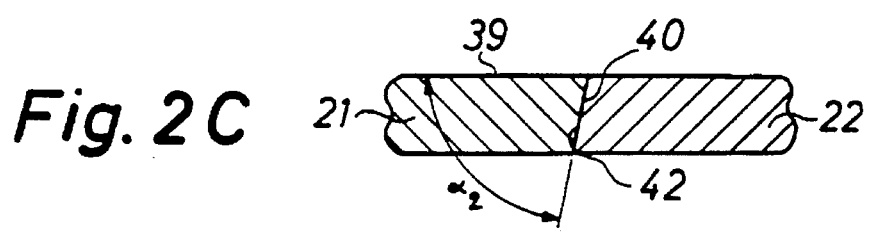

FIG. 2 illustrates an alternative joint made by means of a method according to the invention. At this joint the sheet sections (21,22) are provided with edges (23,24), in a top view having a shape corresponding to the edges shown in FIG. 1. However, the inclination of the edge faces of the edges (23,24) of the sheet sections (21,22) varies along the edges (23,24), when seen relative to the surface of the sheets. The trapezoidal projection (25) of the sheet section (22) is provided with an edge area (38) at the edge (35) corresponding to the long base line of the trapezoid, in which edge area the edge face of the sheet section (22) forms an angle ($\alpha$1) of more than 90° with the surface (39) of the sheet section, as shown in FIG. 2a, and an edge area, wherein the edge face (40) forms an angle ($\alpha$2) of less than 90°, as shown in FIG. 2c. In an area between said two edge face areas (38, 40) a transition area (41) is provided, wherein the edge face is perpendicular to the surface (39— of the sheet section.

Expressed differently, in the edge portion corresponding to the long base line (35) of the trapezoidal projection (25) the sheet section (21) is thus provided with an edge face area (38), wherein the edge face extends beneath the second sheet section (22) (FIG. 2a), an area, wherein the edge face (41) is perpendicular to the surface (39) of the sheet section (21) (FIG. 2b), and an edge face area (40), wherein the edge face (42) of the second section (22) extends beneath the first sheet section (21) (FIG. 2c).

The angles α1 and α2 are such that the sheet sections (21, 23) by being pressed together on the surface (39), that is to say perpendicular to the surface of the paper in FIG. 2, may be brought into engagement with each other by means of a snap effect in said areas having varying edge face angles.

As suggested in FIG. 2 areas having varying edge face angles may be provided in the edge areas of the sheet sections (21,22) corresponding to an extension of the short base line of the trapezoidal projection (25). This embodiment is shown in FIG. 2 by means of dotted lines in said areas. The edge areas having varying edge face angles enable a complete interlocking and fixation of the two sheet sections relative to each other without the use of further fixtures.

The joining principle shown may thus per se be used for joining or holding together sheet sections, or as in the present case be used for accurate fixation of the sheet sections prior to a subsequent finishing of the joint by means of welding (in this case laser beam welding).

Figure 3:
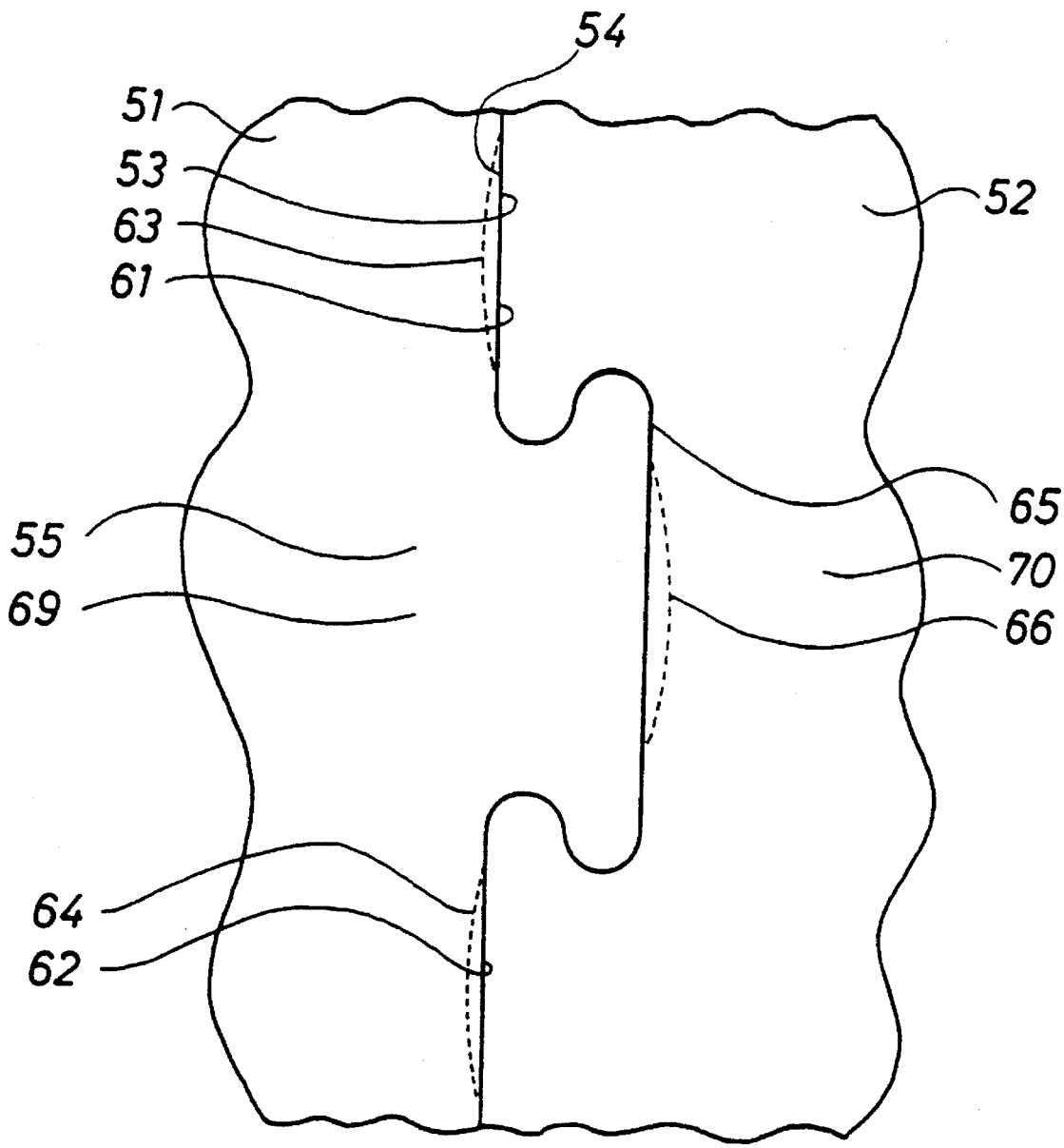
FIG. 3 is a top view of a third joint of two sheet sections obtained by means of the method according to the invention.
Figure 4:
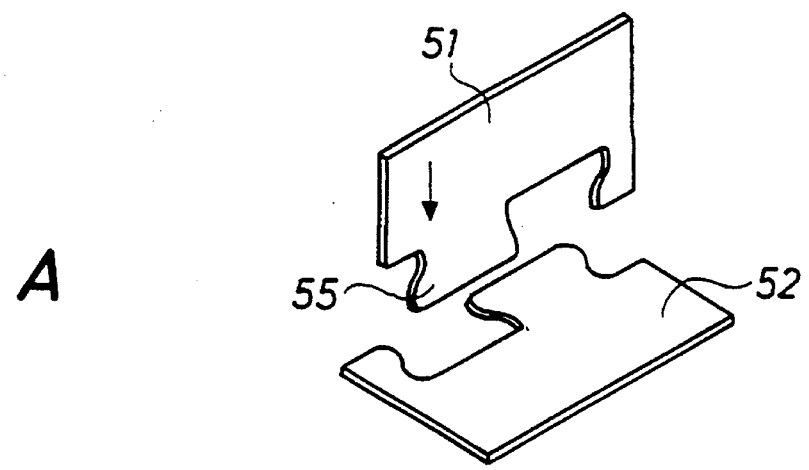
FIG. 4 illustrates how the two sheet sections forming the joint of FIG. 3 are brought into engagement with each other.
Figure 4:
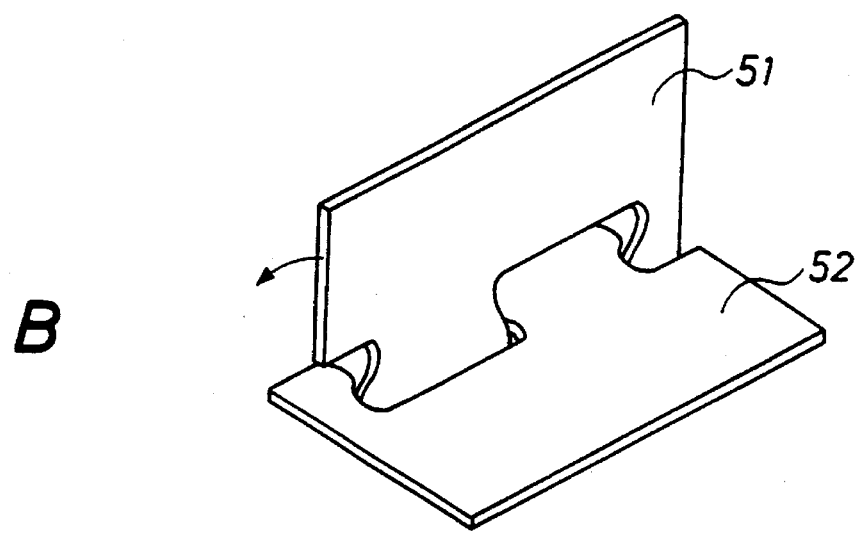
Figure 4:
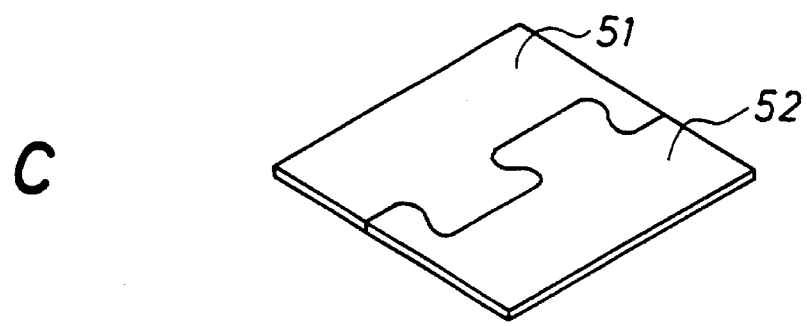

FIGS. 3 and 4 illustrate a further embodiment of joining together two sheet sections (51,52) along the edges (53, 54) provided with a shape as shown in FIGS. 1 and 2, the sheet section (51) being provided with an essentially trapezoidal projection (55) and the sheet section (52) being provided with a complementary area.

The joint illustrated in FIG. 3 differs from the previously mentioned joints by the sheet section (51) in the area corresponding to the long base line of the trapezoidal projection (55) being provided with an edge area (65), wherein the edge face forms an angle of more than 90° with the surface of the sheet section (51), that is to say that the edge face extends beneath the surface (70) of the sheet section (52) in the area (65). Correspondingly, in the areas (61,62) corresponding to an extension of short base line of the trapezoidal projection (55) the sheet section (51) is provided with edge face areas, wherein the edge face forms an angle of less than 90° with the surface (69) of the sheet section (51), that is to say the complementary edge face areas (63,64) of the sheet section (52) extend beneath the sheet section (51). This is illustrated by means of the dotted line in FIG. 3, showing the corner between the lower surface of the sheet sections and the edge faces, the fully drawn line shows the corner between the upper surface (69,70) of the sheet sections and the edge faces.

FIG. 4 illustrates how the two sheet sections (51,52) is brought into mutual engagement by the projection (55) of the sheet section (51) being brought into engagement with the complementary area of the sheet section (52) in the direction of the arrow shown in A, and then pivoting the sheet section (51) relative to the sheet section (52), as shown by means of the arrow in B, whereby the sheet section (51) is brought into the same plane as the sheet section (52), as illustrated in C of FIG. 4 corresponding to the illustration of FIG. 3.

Subsequent to engagement, the two sheet sections (51,52) can only be disengaged by being pivoted and displaced in the opposite direction of the direction shown in A to C of FIG. 4. The engagement or joint is thus self-locking in relation to a load in the first direction perpendicular to the plane of the sheets, that is to say in a direction from beneath and upwards in illustration C of FIG. 4 and in a direction upwards of the surface of the paper in FIG. 3.

The method according to the invention may be used for joining sections of a plurality of various sheet materials, such metal and in particular steel sheets, and of various thickness, in particular thin sheets.

The use of a $CO_2$ laser is considered particularly advantageous carrying out the method according to the invention. A laser of 1 to 3 kw is perferred for producing sheet parts of a thichness of up to 2 to 4 mm.

I claim:

1. A method of accurately joining two sheet sections together (1,2; 21,22; 51,52) along edges (3,4; 23,24; 53,54) of said sheet sections having complementary matching and interlocking shapes, the complementary edges (3,4; 23,24; 53,54) defining at least one projecting area (5; 25; 55) on one sheet section and a complementary area on the other sheet section, comprising cutting the edge of at least one of the sheet sections through the intermediary of a numerically controlled machine with the sheet section being fixed in a fixture, and moving a cutting member relative to the sheet section according to a predetermined path of movement and with said one sheet section being fixedly retained in said fixture, the complementary edges of the two sheet sections abutting each other and the two sheet sections (1,2; 21,22; 51,52) being welded together in a numerically controlled machine through employing the path of movement used during cutting so as to determine the path of welding means during welding together of the two sheet sections.

2. A method as claimed in claim 1, characterised in that the edge face or cut face of the edges (3,4) are arranged on mutually complementary cylindrical faces.

3. A method as claimed in claim 2, characterised in that the edge faces are perpendicular to the surfaces of the sheet sections (1,2) in the joint area.

4. A method as claimed in claim 1, characterised in that the angle (α1, α2) of the edge faces (38,41, 40) relative to the surfaces (39; 60,70) of the sheet sections varies complementary to each other along the edges (23,24;53,54).

5. A method as claimed in claim 4, characterised in that the angle (α1, α2) of the edge face relative to the surface (39) of the sheet sections varies with appropriate minor positive and negative deviations from perpendicular enabling the edges (23,24) of the two sheet sections (21,22) to engage interlockingly.

6. A method as claimed in claim 1, characterised in that the projecting area (5,25,55) is T-shaped or trapezoidal.

7. A method as claimed in claim 6, characterised in that the edge portion (65) of the projecting trapezoidal area (55) corresponding to the long base line of the trapezoidal portion is provided with an edge face forming a positive angle relative to the surface (69) of the sheet section, while the edge portion (61, 62) of the sheet section forming an extension of the short base line of the trapezoid is provided with an edge face forming a negative angle relative to the surface (69) of the sheet section or vice versa.

8. A method as claimed in claim 6, characterised in that the edge portion (35) of the projecting trapezoidal area (25) corresponding to the long base line of the trapezoidal portion is provided with an edge face having portions (38) of both a positive and a negative (40) angle (α1, α2) relative to the surface (39) of the sheet section, and the edge portion (31,32) forming an extension of the short base line of the trapezoid likewise is provided with an edge face having both portions with a positive and a negative angle relative to the surface of the sheet section (39).

9. A method as claimed in claim 6, characterized in that the edge portion (65) of the projecting trapezoidal area (55) corresponding to the long base line of the trapezoidal portion is provided with an edge face forming a positive angle relative to the surface (69) of the sheet section., while the edge portion (61, 62) of the sheet section forming an extension of the short base line of the trapezoid is provided with an edge face forming a negative angle relative to the surface (69) of the sheet section or vice versa.

10. A method as claimed in claim 6, characterized in that the edge portion (35) of the projecting trapezoidal area (25) corresponding to the long base line of the trapezoidal portion is provided with an edge face having portions (38) of both a positive and a negative (40) angle ($\alpha 1$, $\alpha 2$) relative to the surface (39) of the sheet section, and the edge portion (31, 32) forming an extension of the short base line of the trapezoid likewise is provided with an edge face having both portions with a positive and a negative angle relative to the surface of the sheet section (39)

\* \* \* \* \*